United States Patent
De Rijk et al.

(10) Patent No.: US 7,728,634 B2
(45) Date of Patent: Jun. 1, 2010

(54) FLEXIBLE WAVEFORM GENERATOR WITH EXTENDED RANGE CAPABILITY

(75) Inventors: Johannes Hermanus Aloysius De Rijk, Rotterdam (NL); Robertus Laurentius van der Valk, Capelle aan den IJssel (NL)

(73) Assignee: Zarlink Semiconductor Inc. (CA)

( * ) Notice: Subject to any disclaimer, the term of this patent is extended or adjusted under 35 U.S.C. 154(b) by 118 days.

(21) Appl. No.: 12/179,712

(22) Filed: Jul. 25, 2008

(65) Prior Publication Data

US 2009/0184736 A1    Jul. 23, 2009

(30) Foreign Application Priority Data

Jul. 31, 2007   (GB)   ................... 0714848.9

(51) Int. Cl.
*H03B 21/00* (2006.01)
(52) U.S. Cl. ...................................... 327/105

(58) Field of Classification Search .......... 327/105–107
See application file for complete search history.

(56) References Cited

U.S. PATENT DOCUMENTS

| | | | | |
|---|---|---|---|---|
| 3,500,213 A | * | 3/1970 | Ameau | ........................ 327/107 |
| 3,657,657 A | * | 4/1972 | Jefferson | ..................... 327/117 |
| 4,068,178 A | * | 1/1978 | Tunzi | ........................... 327/107 |
| 5,598,448 A | * | 1/1997 | Girardeau, Jr. | ............... 375/376 |
| 6,127,859 A | | 10/2000 | Lim | |

* cited by examiner

*Primary Examiner*—Lincoln Donovan
*Assistant Examiner*—William Hernandez
(74) *Attorney, Agent, or Firm*—Lawrence E. Laubscher, Jr.

(57) ABSTRACT

A frequency synthesizer includes a first clock running at a frequency $f_{CLK1}$, a second clock running at a frequency $f_{CLK2}$, wherein frequency $f_{CLK2}$ is higher than frequency $f_{CLK1}$, the frequencies having a fixed ratio $Q_{FB}=f_{CLK2}/f_{CLK1}$; and a counter driven by the first clock. A decoder for produces $Q_{FB}$ output values in parallel for each cycle of the first clock, and parallel-serial converter serially outputs these $Q_{FB}$ output values at the frequency of the second clock.

20 Claims, 12 Drawing Sheets

FLEXIBLE WAVEFORM GENERATOR WITH EXTENDED RANGE CAPABILITY

FIELD OF THE INVENTION

This invention relates to the field of frequency synthesis, and in particular to a flexible waveform generator with extended range capability.

BACKGROUND OF THE INVENTION

In frequency synthesis an accurate reference clock is used as basis for stability and accuracy. However such a clock generally has a fixed frequency. Therefore, fractional frequency synthesizers with analog PLLs (Phase Locked Loops) are used to generate a clock with the desired frequency. An analog PLL is usually used to multiply the frequency and a divider is used to divide the frequency.

There are many applications that require a very wide frequency spanning multiple decades from hundreds of MHz down to 1 Hz. Such a range is not feasible for the Voltage Controlled Oscillator (VCO) that is part of the analog PLL. Additionally to suppress jitter and noise the VCO frequency range should be limited to up most an octave. This makes the VCO frequency range relatively small. When the maximum VCO frequency is chosen to be the highest required frequency, the output frequency range of the synthesizer can be increased by the use of counters/dividers.

When the frequency synthesizer with its analog PLL and its dividers is implemented in a silicon chip the hardware is fixed and cannot be changed afterwards. This means that when an output clock is needed with frequency below the lower limit a new die is needed. An example for frequency synthesis can be found in U.S. Pat. No. 5,905,388.

Frequency synthesis systems make much use of counters and/or dividers in their designs. They are used to reduce the frequency of some clock generator or to count a sequence of states that can be decoded to produce a complex waveform. The fractional frequency synthesizer of FIG. 1 is an example of such a system. In such a system, the output frequency is given by the expression $$f_{out} = \frac{Q_{FB}}{Q_{in} \cdot Q_{out}} \cdot f_{reference}$$

The schematics and designs of such counters and/or dividers can be found in any basic textbook on digital electronics. The counters can be designed either with a fixed division ratio or flexible with programmable division ratio between 1 and the maximum count value $Q_{max}$. The counting range or division ratio will be limited. When a larger division ratio is needed the counter design needs to be changed. This requires a hardware modification.

The architecture of a frequency synthesizer includes the following elements: A reference; an analog PLL; a counter, and a decoding circuit. The decoding circuits translates/decodes the counter state to an output value. The shape of the output value could be a 50% duty cycle clock, a frame pulse or any other complex repeating signal as shown in FIG. 2.

Counters and dividers have some inherent limitations that have nothing to do with the skill of the circuit designer or the nature of counters. Some of these limitations are:

The carry chain limits the maximum speed.

The parallel load circuit forms a load on the counter circuits and limits the maximum speed. After loading a new counter value the carry chain must be updated within a single clock cycle.

Reset circuits form also a load on the counter circuit although it might be less than the parallel load circuits.

The output counters of a fractional PLL, which are connected to the VCO, will run at high clock rates and thus consume much power. Consequently long divider chains ($Q_{out}$ is large) will consume a considerable amount of power.

The decoding logic for the programmed division ratio and the frames pulses also runs at the high frequency of the VCO clock. Thus power consumption is high. Power of 2 division is achieved by choosing the correct tap of the counter. Than there is no decoding logic thus the power consumption is limited.

Hardware determines the maximum division ratio and you cannot surpass that barrier. Factory test time is getting a problem when the counter chains are getting long. The counters cannot be included into the scan chain because the extra circuitry forms an extra load and would decrease the maximum usable clock frequency of the counters.

The start up phenomena in the analog PLL and output counters will introduce input/output and output/output misalignment. At start up the output counters will enter an undefined state. When two or more analog PLLs are started, the analog PLLs will follow different trajectories to a locked state even when they use the same clock as reference. This is due to slightly different component values, different noise sources, and delay values. The number of generated clocks over the locking period will be different. Consequently the counters that are connected to different analog PLLs will have different states.

Switching over to another reference frequency during the operation will force the analog PLL to lock to a different frequency. During locking the relation with the input clock might be lost. The trajectory the analog PLL follows during the locking has random components and is for a part not predictable. This will result in misalignment of the output in relation with the input and the other outputs.

Signals and clocks coming from different output counters will have different phases and there is a significant output-output offset and uncertainty about the offset. This is an undesired phenomenon. Precise and defined relations between different output clocks are a hard requirement for frequency synthesizers. In telecom systems, for example, when the frame pulse occurs all clocks must have rising edges at that moment.

These problems are solved when all counters have a direct relation with the reference. The relations between the analog PLLs and the reference are already defined. The reference is directly connected to the input of the PLL. But the counters must be tied to the reference. The state of the counters must be enforced to defined values at prescribed moments.

Loading a counter with a defined value on a precise moment can be done two different ways. Either the counter can be loaded with a constant value, which is not necessarily zero. This is called reset. Or, the counter is loaded with a varying value this is called loading. In essence reset is a specific form of loading. Both methods have been used either stand alone or in combination.

When the frequencies of the output clocks are very different; in other words with a very low common frequency, the number of common moments suitable for reset is significantly reduced. When more than one FEC (Forward Error Correcting) ratio is present in a telecom system the common frequency is very low. This causes long startup times. It takes a long time before one can be certain that the outputs are properly aligned. This will also become a problem during factory testing. Reset is not a optimal solution.

Factory test time of silicon chips is expensive. The more test time is required, the more money is involved. Any fabricated chip must be tested before can be sold and used. As stated earlier scan chains can be used in output counters because of the high frequencies involved. Only functional testing is possible. When however a long divider chain is required the test time will become unacceptably large.

SUMMARY OF THE INVENTION

The present invention addresses a number of the above-mentioned problems. It comprises two clocks whose frequencies have a fixed ratio $Q_{FB}=fCLK2/fCLK1$. One clock CLK1 has a low frequency and is used for counting and decoding. The second clock, CLK2, running at a higher rate is used to output the results of the counting and decoding operation.

Thus, according to the present invention there is provided a frequency synthesizer comprising a first clock running at a frequency $f_{CLK1}$; a second clock running at a frequency $f_{CLK2}$, wherein frequency $f_{CLK2}$ is higher than frequency $f_{CLK1}$, said frequencies having a fixed ratio $Q_{FB}=f_{CLK2}/f_{CLK1}$; a counter driven by said first clock and incrementing by a predetermined number which is either $Q_{FB}$ or a submultiple of $Q_{FB}$ for each cycle of said first clock; a decoder for converting the output of said counter to produce $Q_{FB}$ or a submultiple thereof output values in parallel in successive cycles of said first clock; and a parallel-serial converter for serially outputting said output values at a rate determined by said second clock.

Embodiments of the invention offer a new architecture for output counters with one or more of the following benefits: Maximum division ratio is not limited by hardware; possibly higher VCO frequency; Quickly restored output-output alignment; Output-output alignment does not depend on the locking behavior of the analog PLL; Clock and frame pulse signals are generated with the same hardware; Easy to create offsets with a VCO cycle resolution; Shorter factory test time.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
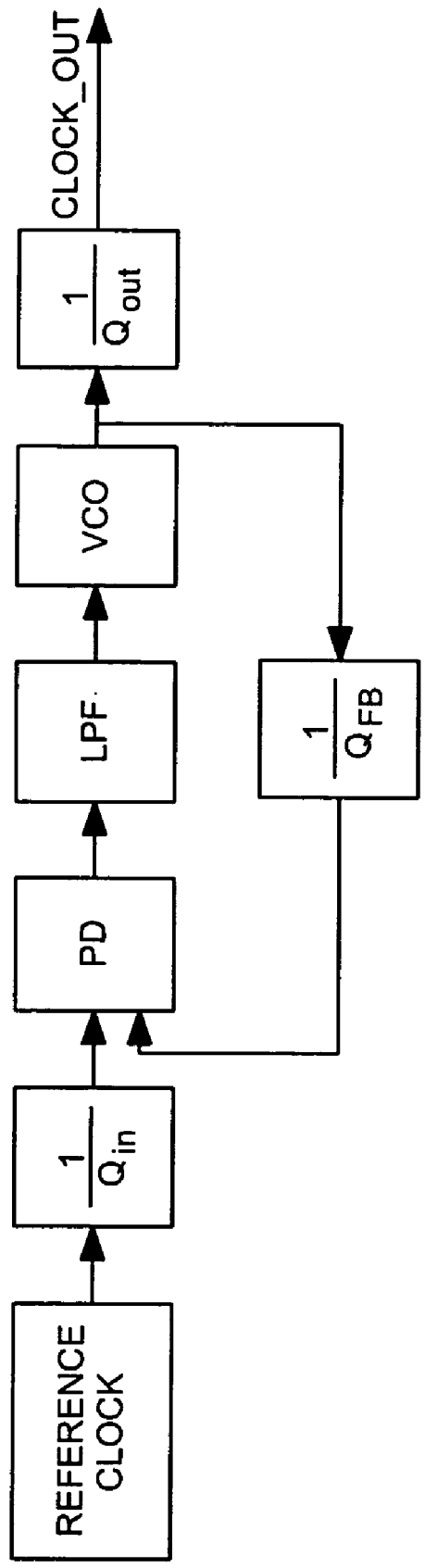
FIG. 1 is a block diagram of a fractional frequency synthesizer.
Figure 2:
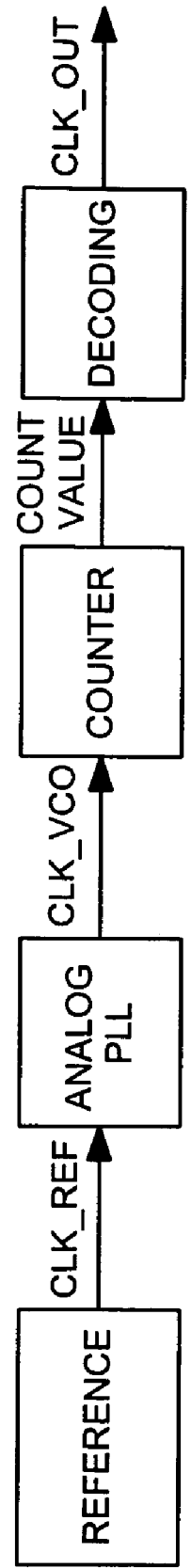
FIG. 2 is a functional block diagram of output counters and its surrounding circuits.
Figure 3:
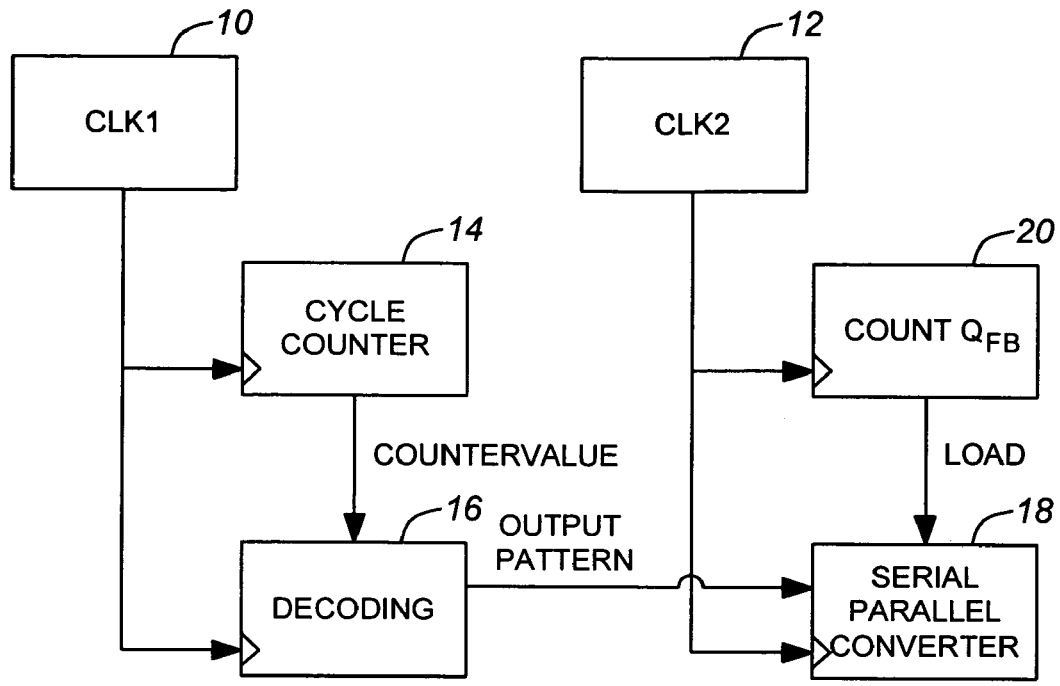
FIG. 3 is a block diagram of the new counter structure in accordance with one embodiment of the invention.

A counter structure in accordance with an embodiment of the invention is shown in FIG. 3, which comprises clocks CLK1 10, and CLK2 12. Cycle counter 14 counts the output of clock CLK1 10 and presents its output to decoder 16, which feeds serial parallel converter 18. Counter 20 counts the output of clock CLK2 12, which loads the serial parallel converter 18.

Since the counting is done at a lower rate it is not possible to count the cycles of the high speed clock directly. There is however a relation between the frequencies of the low-speed clock and the high speed clock. For each cycle of the low speed clock the high speed clock will produce $Q_{FB}$ cycles. Thus for each low speed clock cycle $Q_{FB}$ high speed clock cycles must be counted.

The decoding circuit 16 that converts counter values to output values also runs at a lower frequency. For each cycle of CLK1 it generates multiple, that is $Q_{FB}$, output values in parallel. The set of output values are placed sequentially on the output at the rate of CLK2. Parallel-serial converter 18 runs at the speed of the high speed clock CLK2. A parallel-load shifter loads each reference cycle the $Q_{FB}$ output values into the shift register and successively shifts them out. Alternatively the data is loaded into a register and a multiplexer successively selects them for output.

Now that the counters and decoders run at lower frequency the capacitive load on the counting circuits due to decoding logic is no longer a problem. The circuits have more time to settle and any carry has time to ripple through the circuit. Updating the counters with a new value is then also no problem. Because the control and/or interface logic can run synchronously with the cycle counters and decoders on the low speed clock no synchronizer is needed for the reset or load signal.

Figure 4:
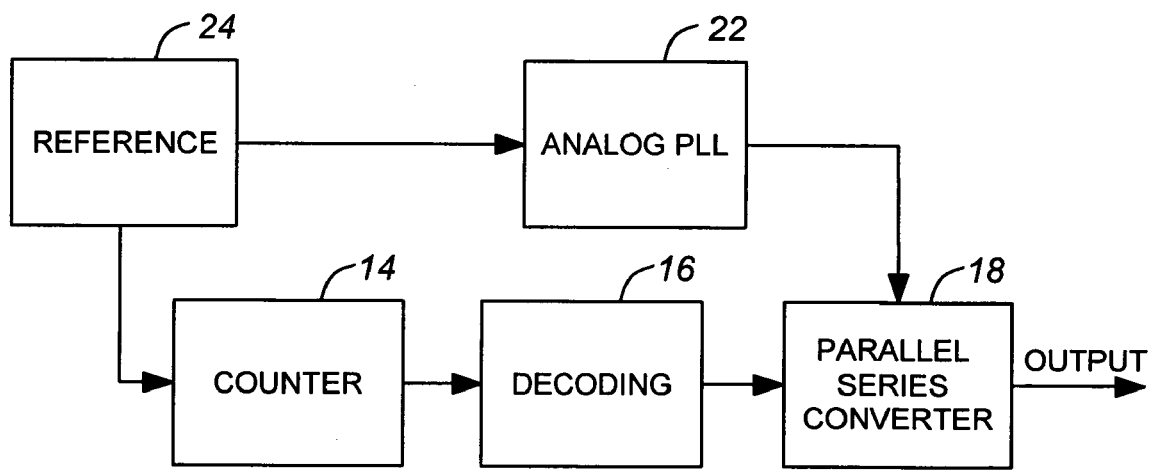
FIG. 4 is a block diagram of counter structure where the high speed clock is generated with a PLL.

A analog PLL 22 with stable reference 24 can be used to generate the high speed clock from the low speed clock as shown in FIG. 4. In this case the feedback divider of the analog PLL 22 will determine the frequency ratio of the high and the low speed clock. However other methods to define the relation between high speed and low-speed clock can also be used; for instance CLK2 can be divided to obtain CLK1.

Figure 5:
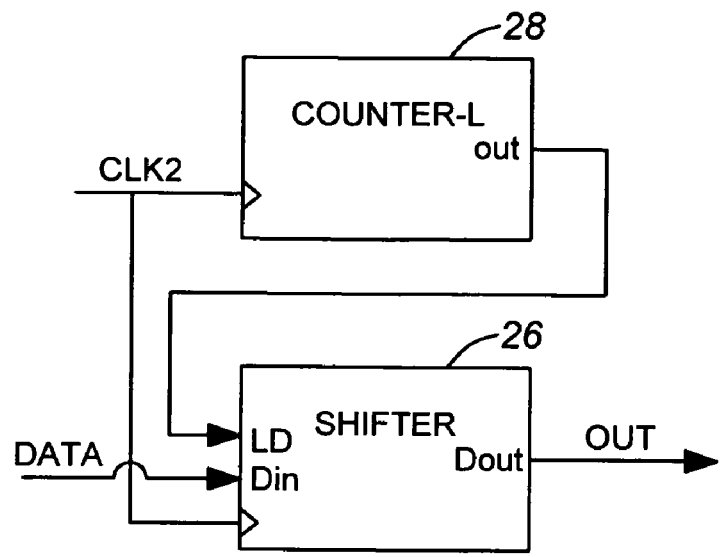
FIG. 5 illustrates a shifter.

A shifter 26 with a counter 28, such as is shown in FIG. 5, is a less complex circuit. The lower complexity forms a smaller load on the circuit and thus enables it to run on a higher clock frequency. However a parallel loading circuit is required to load any applicable data into the shifter 26. A parallel load circuit forms however a smaller load than counter circuits and decoding circuits would be.

Figure 6:
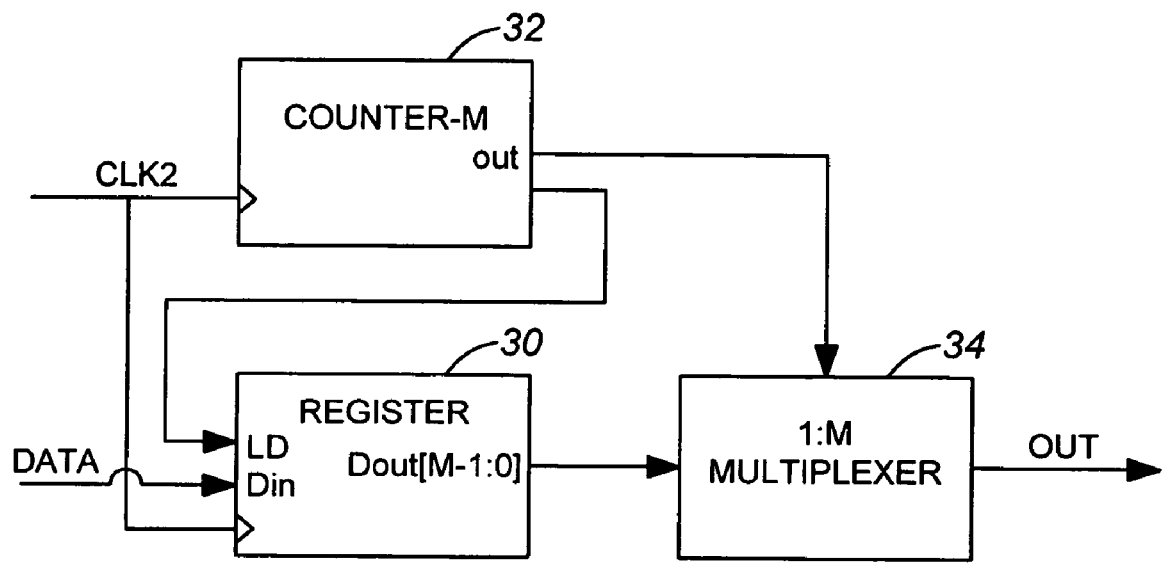
FIG. 6 depicts a register and a multiplexer.
Figure 7:
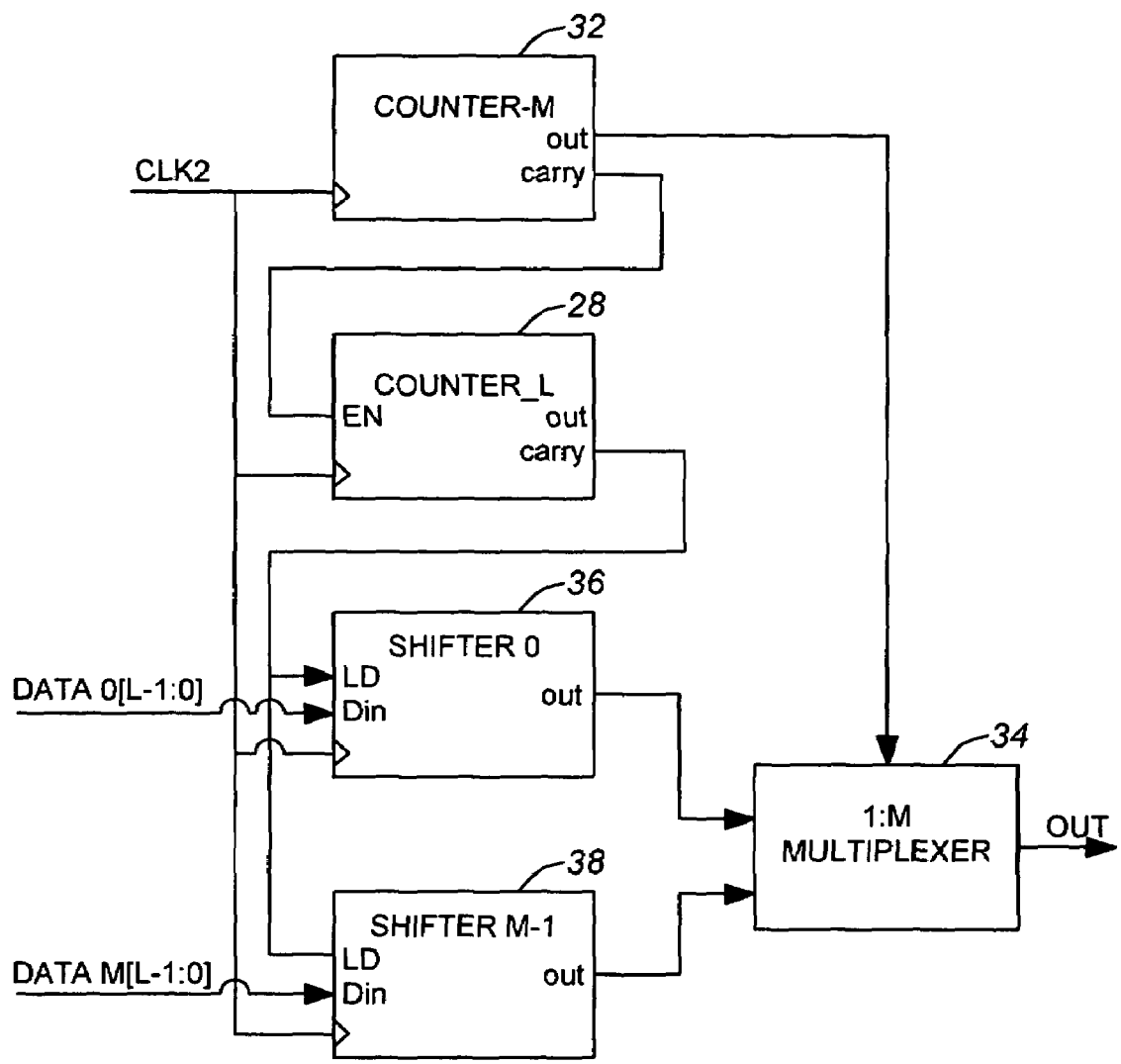
FIG. 7 depicts a combination of shifters and a multiplexer.

An alternative technique is to load the data parallel into a register 30 with the aid of counter 32 and multiplex the data to the output with multiplexer 34 as shown in FIG. 6. A combination of the above two circuits is also possible as shown in FIG. 7. When M shifters 36, 38 are used multiplexer 34 successively selects the outputs of the shifters 36, 38. And when all shifter outputs have been put to the output the shifters 36, 38 shift their data one position and the multiplexer starts again with the output of the first shifter. Such an arrangement is shown in FIG. 7.

When a PLL is used to create the high-speed clock CLK2 from the low-speed clock CLK1 the counters M and L 32, 28 are already present in the analog PLL 22 as the feedback divider, so this does not add extra circuitry. The maximum count value of the counters M and L is equal to the feedback ratio QFB. In the combined solution of shifters and multiplexer the product of M and L is equal to the feedback ratio $Q_{FB}$. This fits with the requirement that for each reference cycle $Q_{FB}$ output values are needed.

Mathematically speaking dividers are incrementers that are combined with a modulo operation. In other words they count and wrap around at the modulo value which happens to be the divider ratio Qout. (The result of the modulo operation is the remainder of an integer division.) Each high-speed clock cycle the counter increments until the end value (modulo value) is reached at which point the counter wraps around and gives a carry pulse to indicate it has wrapped around. Formulating this in mathematics with jcLK2 being the high-speed counter value:

$$\phi CLK2[n+1]=(\phi CLK2[n]+1) \bmod Q_{out}$$

For each low-speed clock cycle the high-speed clock will generate $Q_{FB}$ cycles. Here $Q_{FB}$ is the frequency ratio of the two clocks. So instead of counting each high-speed clock individually they will be counted in groups of $Q_{FB}$. Whenever the low speed clock produces a cycle $Q_{FB}$ is added to the cycle counter. The new counter value is found with:

$$\phi CLK2[n+1]=(\phi CLK2[n]+Q_{FB}) \bmod Q_{out}$$

Figure 8:
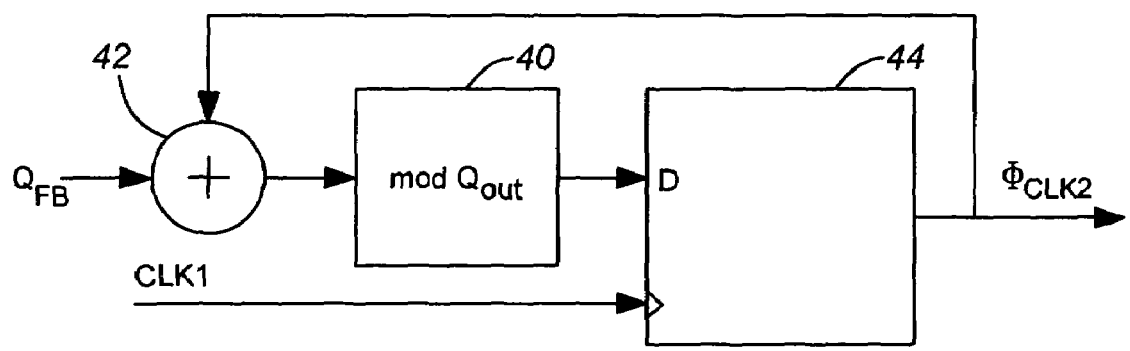
FIG. 8 depicts a cycle counter running at the low-speed clock.

This equation must be evaluated every low-speed clock cycle as shown in FIG. 8, which includes modulo counter 40, adder 42, and D-type flip-flop 44. If we rewrite the equation we get:

$$\phi CLK2[n+1]=(\phi CLK2[n]+(Q_{FB} \bmod Q_{out})) \bmod Q_{out}$$

Figure 9:
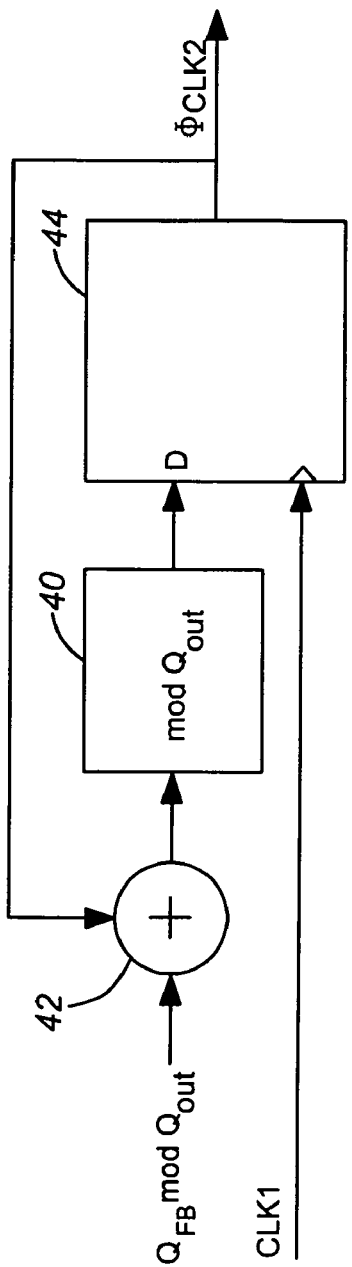
FIG. 9 depicts an improved cycle counter running at the low-speed clock.

This equation results in simpler hardware for the modulo operation, which can be implemented as shown in FIG. 9. This shows the cycle counter running at the low clock speed. The ($Q_{FB}$ mod $Q_{out}$) part needs to be calculated only once and the stored result can be used instead. It is only necessary to subtract up most one factor $Q_{out}$. When $Q_{out}$ is very small compared to $Q_{FB}$, multiple factors $Q_{out}$ must be subtracted from the sum. This is inconvenient to do in hardware. The value of ($Q_{FB}$ mod $Q_{out}$) can be programmed into a register.

In an alternative embodiment, a hardware table can be used. Since the frequency ratio has a limited division ratio value QFB, the table can also be kept limited in size.

TABLE 3

Example table for $_{(QFB}{}^{mod}{}_{Qout)}$ for the case QFB = 8.

| Qout | QFB$^{mod}$Qout |
|---|---|
| 1 | 0 |
| 2 | 0 |
| 3 | 2 |
| 4 | 0 |
| 5 | 3 |
| 6 | 2 |
| 7 | 1 |
| 8 | 0 |
| >8 | 8 |

Figure 10:
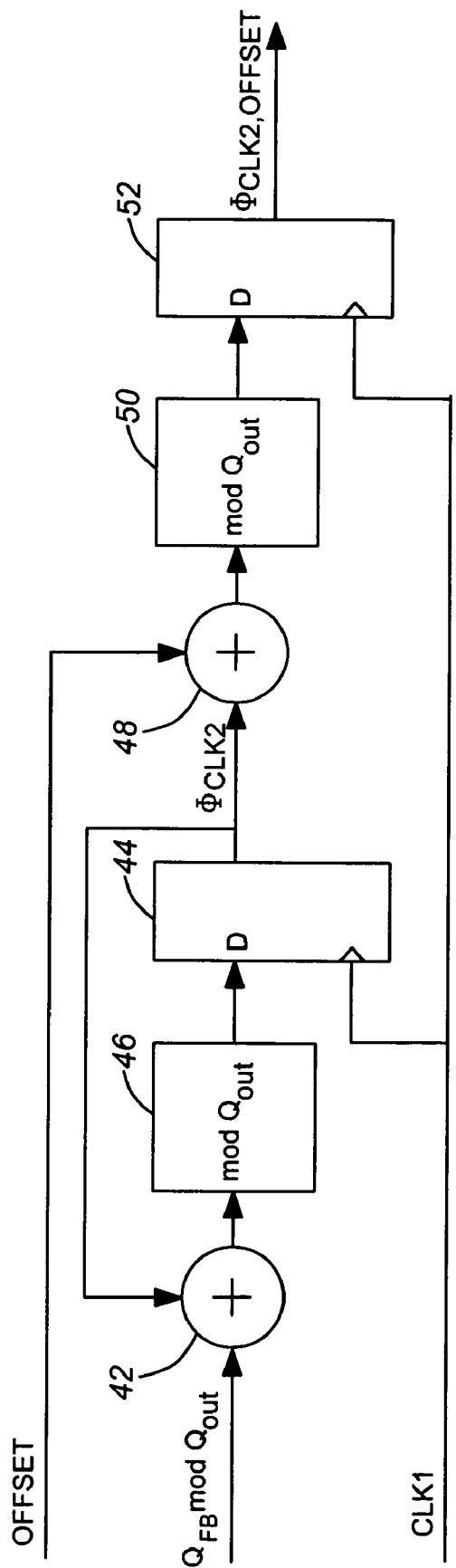
FIG. 10 depicts a cycle counter with offset circuit.

It is now very easy to create time offsets in steps of one cycle of the high-speed clock. It is just necessary to add the number of high-speed clock cycles of offset that is desired to the value of the cycle counter and perform the modulo $Q_{out}$ operation. Again this operation is carried out at a low clock rate. FIG. 10 shows a possible implementation. This embodiment further comprises a second adder 48, a second modulo counter 50, and second D-type flip-flop 52.

For the decoder implementation the table can contain the waveforms for different values of $Q_{out}$. A method using thresholds can be employed. The threshold values determine cycle counter values for which the output changes and edges occur. We will see that the table method is most efficient for small values of $Q_{out}$ and that the method with thresholds and edges can be extended to cross the barrier of maximum count value of hardware implemented counters.

Table Method

With the cycle counter value known the next $Q_{FB}$ output values for an output pattern must be generated. The decoder maps the cycle counter value to an output value. But with the cycle counter running at a lower clock frequency multiple output values must be calculated. The next QFB number of output values starting from the current cycle value must be determined.

Figure 11:
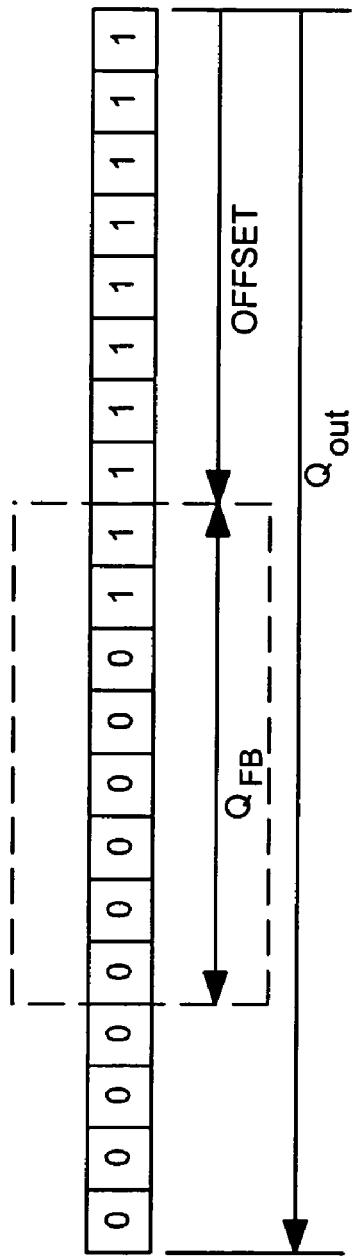
FIG. 11 shows the use offset to find the output pattern in the table.

When the full waveform is stored in a table the counter value can be used as an offset in the table to determine next output values. When the table is placed in a register a barrel shifter can be used to select the correct part of the waveform. The cycle counter value is used as an offset in the table to find the output pattern. See FIG. 11 is graphical representation. As shown in FIG. 11, the data is shifted out to the right.

Figure 12:
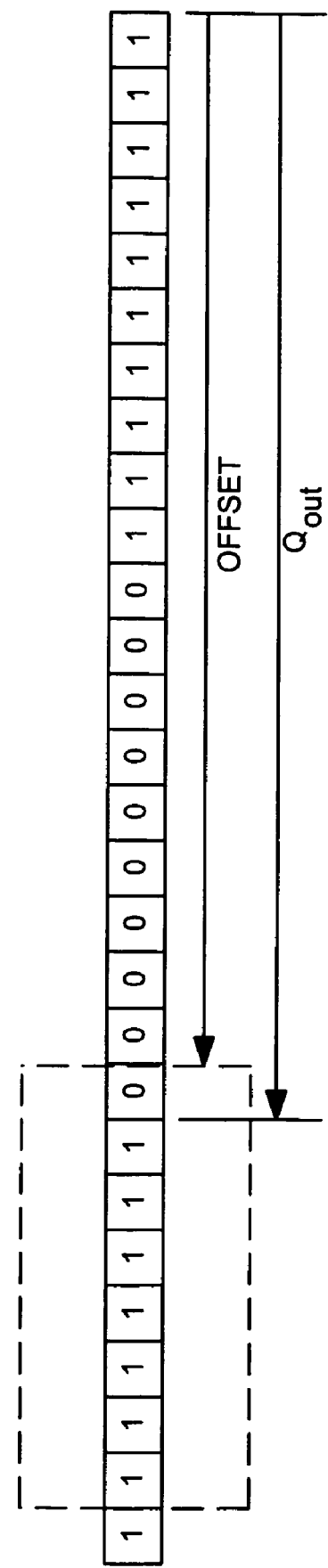
FIG. 12 shows the use offset to find the output pattern at the end of the table.

When the counter value is for instance $Q_{out-1}$ a wrap around must occur to the first part of the waveform. In hardware this not handled easily since the value for $Q_{out}$ can change. Therefore the waveform is extended with the next $Q_{FB-1}$ values, which happen to be the first values are copied. A similar problem occurs when $Q_{out}$ is smaller than $Q_{FB}$. The waveform must be extended. The minimum size of the waveform or base pattern is $Q_{out}+Q_{FB}-1$. When the highest count value of the cycle counter is reached at the moment of a reference cycle then $Q_{FB}-1$ additional bits are needed for a complete output pattern as illustrated in FIG. 12.

Table 4 gives examples up to the $Q_{out}=8$. However division by 1 is simply the high-speed clock itself and that a circuit for the division by zero is still a challenge for engineers. When the division ratio is odd the output clock does not have a 50% duty cycle.

TABLE 4

Sample table for dock waveform patterns.

| Qout | Pattern in | Pattern in binary |
|---|---|---|
| 2 | 0x5555 | 01010101_010101 |
| 3 | 0x9249 | 10010010 010010 |
| 4 | 0x3333 | 00110011 001100 |
| 5 | 0x9ce7 | 10011100 111001 |
| 6 | 0x71c7 | 01110001 110001 |
| 7 | 0xc387 | 11000011 100001 |
| 8 | 0x0f0f | 00001111_000011 |

When $Q_{out}$ is increasing the size of the base pattern also increases. For large values of $Q_{out}$ the base pattern will become too large to store. So this method is only feasible for small values of Qout.

Figure 13:
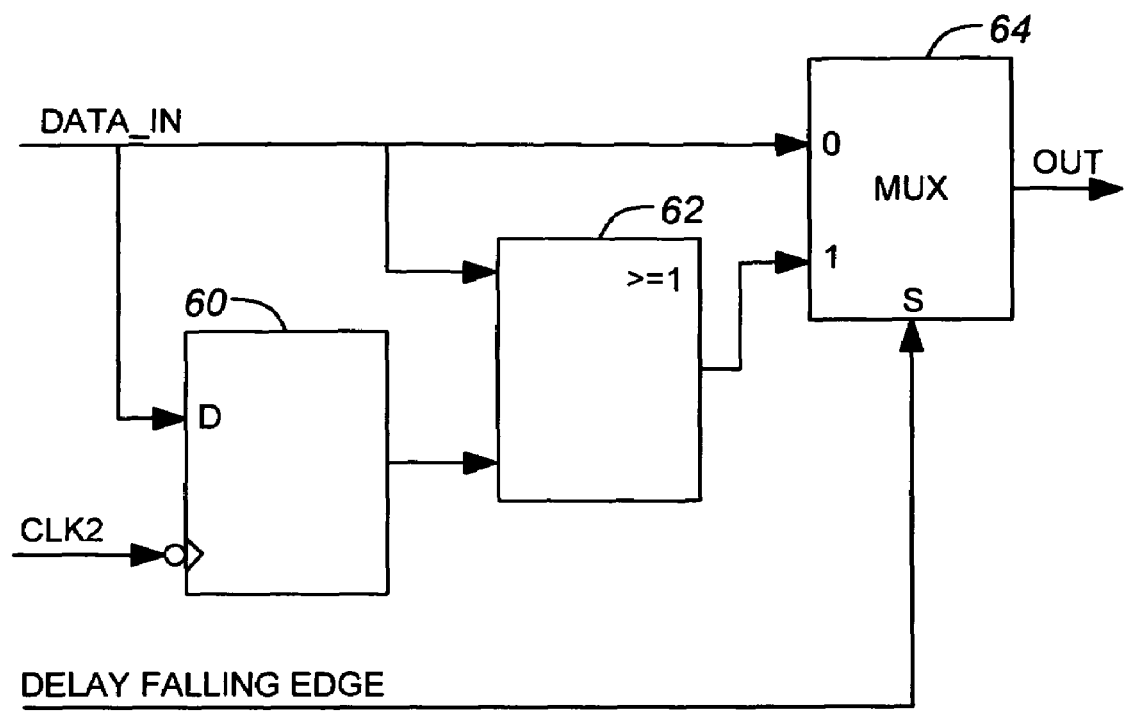
FIG. 13 depicts a circuit to delay the falling edge with half a clock cycle.
Figure 14:
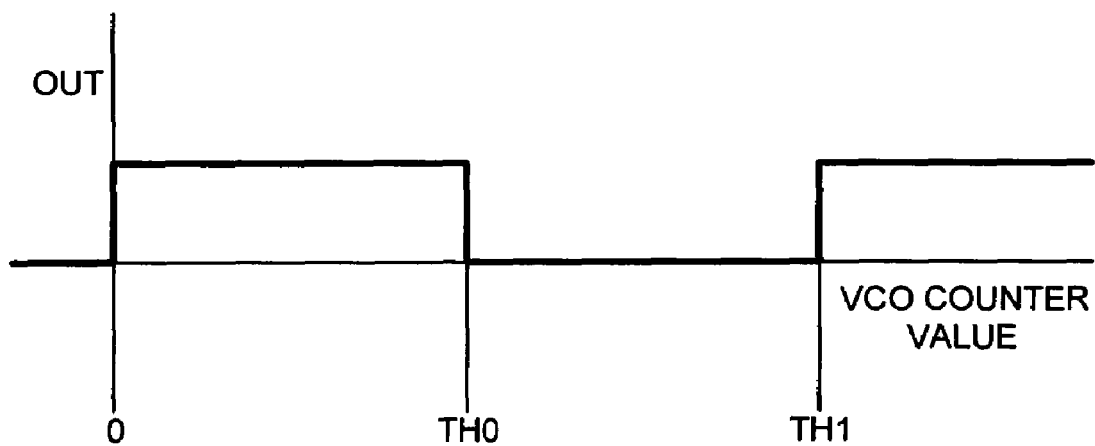
FIG. 14 depicts a clock signal and counter thresholds for the edges.

By adding the circuit of FIG. 13 comprising D-type flip-flop 60, comparator 62, and multiplexer 64 after the parallel series converter the falling edge of the clock can be delayed with half a high speed clock cycle thus restoring the 50% duty cycle.

Figure 15:
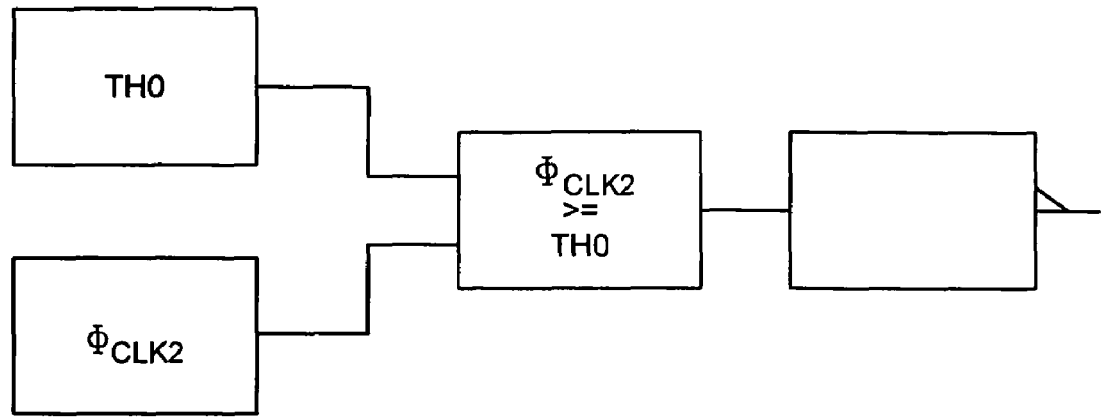
FIG. 15 is a functional block diagram mapping function with one threshold.

A simple implementation for the decoder checks whether the cycle counter value $\phi_{CLK2}$ is above or below the threshold TH0, which is in the case of clock signals half the division value $Q_{out}$. Since the cycle counter never reaches TH1, the division value $Q_{out}$, the hardware can be as simple as in FIG. 15.

As explained earlier the mapping function hardware has to generate multiple output values per cycle of the low-speed clock. For each low-speed clock cycle $Q_{FB}$ high speed clock cycles are processed. This implies that a total of $Q_{FB}$ comparators would be required to compare the next $Q_{FB}$ cycle counter values and find the output pattern. We need to compare the threshold TH0 with $\phi$CLK2, $\phi$CLK2+1, ... , and $\phi_{CLK2}+Q_{FB-1}$.

Figure 16:
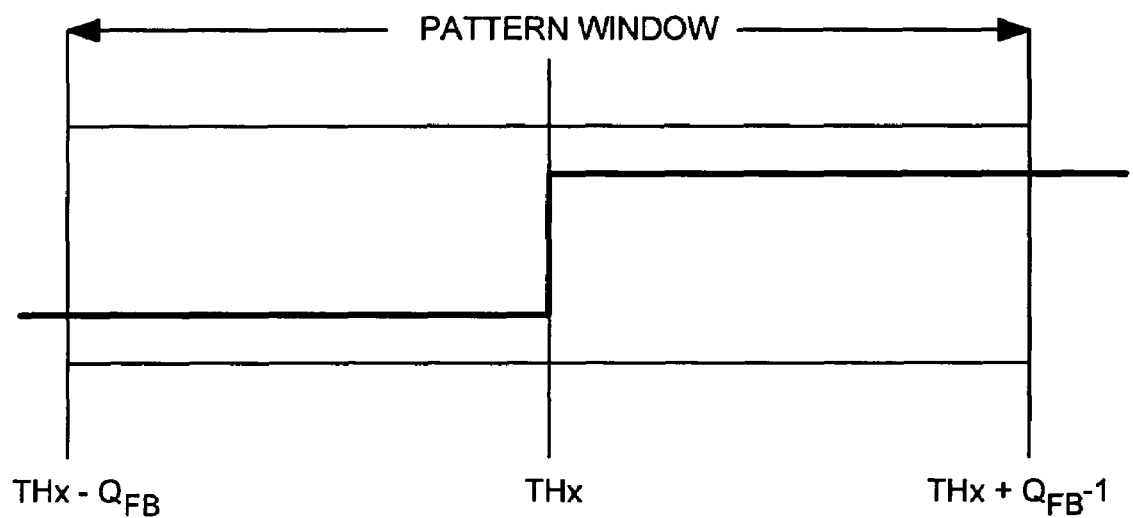
FIG. 16 is a threshold and base pattern window time diagram.

We start with an output pattern for the comparator around the threshold of the edge as shown in FIG. 16. The pattern will be $2*Q_{FB}$ bits wide. It consists of a low period and high period. The level indicates that the threshold has been crossed or not. Now we calculate an offset for the correct output pattern. The start of the pattern begins at the threshold value THx minus the feedback division ratio $Q_{FB}$. Thus we subtract (THx−$Q_{FB}$) from the current cycle counter value $\phi_{cLK2}$. If the result is negative the threshold has not been passed and we use 0 as offset. If the result falls between 0 and $Q_{FB}$, both ends included, the difference is the required offset. When the result is above $Q_{FB}$, the threshold has been crossed earlier and we use $Q_{FB}$ as offset. Table 5 presents the matter in condensed form.

TABLE 5

Offset values for the difference between cycle counter and threshold.

| jCLK2 − (THx − QFB) | Offset in pattern |
|---|---|
| <0 | 0 |
| >=0 and <=QFB | jCLK2 − (THx − QFB) |
| >QFB | QFB |

Figure 17:
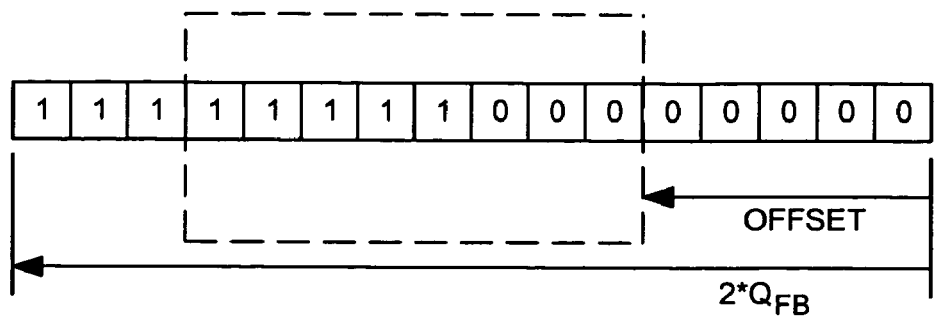
FIG. 17 shows a base pattern for the threshold method.
Figure 18:
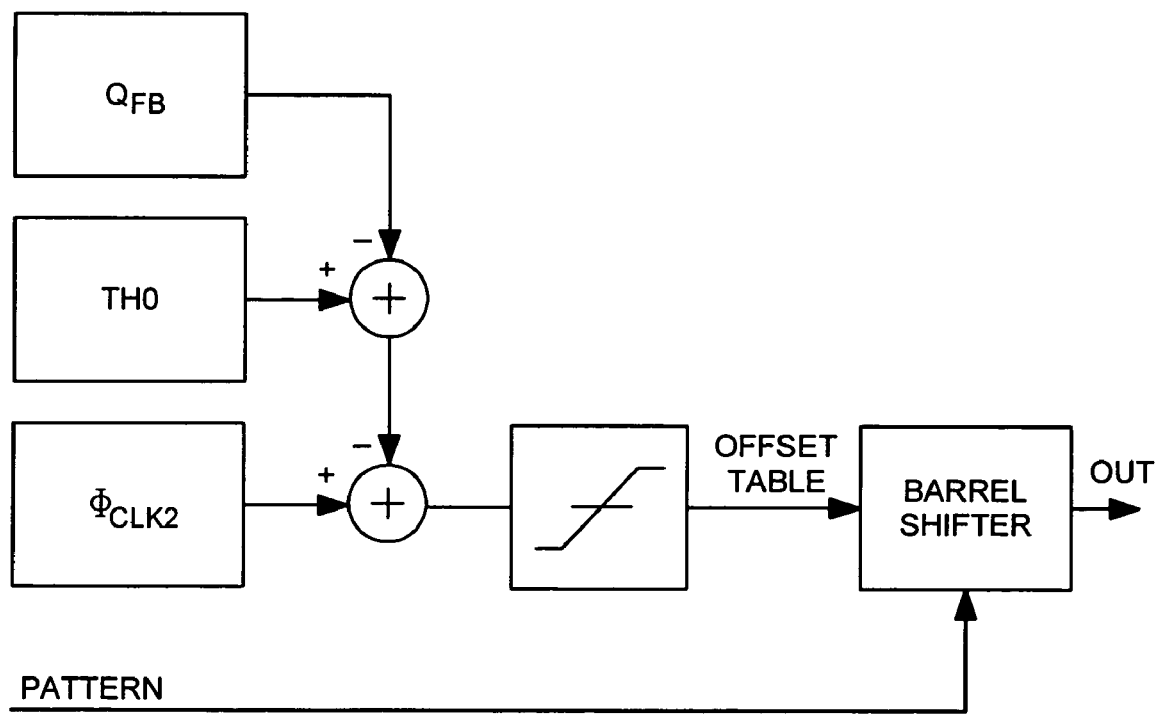
FIG. 18 is a functional block diagram of a threshold comparator with multiple outputs.

The used base pattern and its use can be found in FIG. 17.

When the counter value is for instance $Q_{out-1}$ a wrap around must occur to the first part of the waveform. In hardware this not handled easily since the value for $Q_{out}$ can change. Therefore threshold TH1 also needs to be implemented in hardware next to threshold TH0. The result of the two threshold comparators must be combined. For this Table 6 has been compiled. In general TH0 will cross before TH1 however we need to define a value for that case TH1<TH0. For reasons of simplicity we choose the rule to be if one threshold has been crossed the output will be 0 when zero or two output have been crossed the output will 1. Study of the table shows that the table describes an EXNOR function. Threshold TH1 will set to Qout.

TABLE 6

Output mapping of threshold results.

| Result TH1 | Result TH0 | Required output |
|---|---|---|
| 0 | 0 | 1 |
| 0 | 1 | 0 |
| 0 | 0 | 0 |
| 1 | 1 | 1 |

Figure 19:
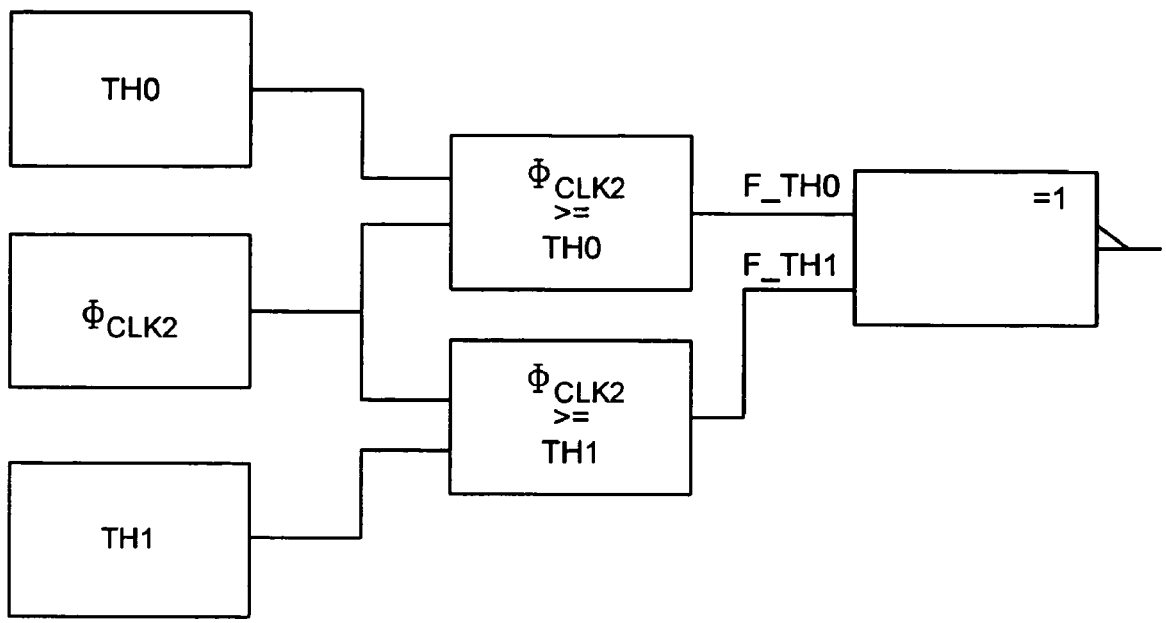
FIG. 19 is a functional block diagram for two threshold comparators and a combiner circuit.
Figure 20:
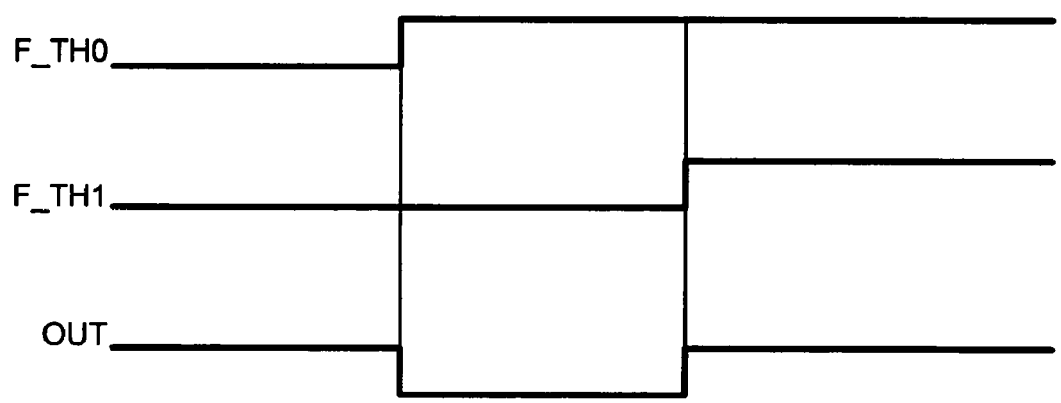
FIG. 20 is a time representation of the threshold results and the EXNOR'ed result.

FIG. 19 and FIG. 20 display a functional block diagram and a possible waveform respectively.

The outputs of the threshold comparators are The $Q_{FB}$ bit wide EXNOR function has a $Q_{FB}$ bit wide result.

The multiple values for the output of both thresholds are generated in the same way as it is used for the single threshold. The output results of both thresholds are bitwise EXNOR'ed in a $Q_{FB}$ wide word. The resulting word is then loaded into the series-parallel converter. This will have same result as loading the results in two series-parallel converters and EXNOR the output of the converters.

Figure 21:
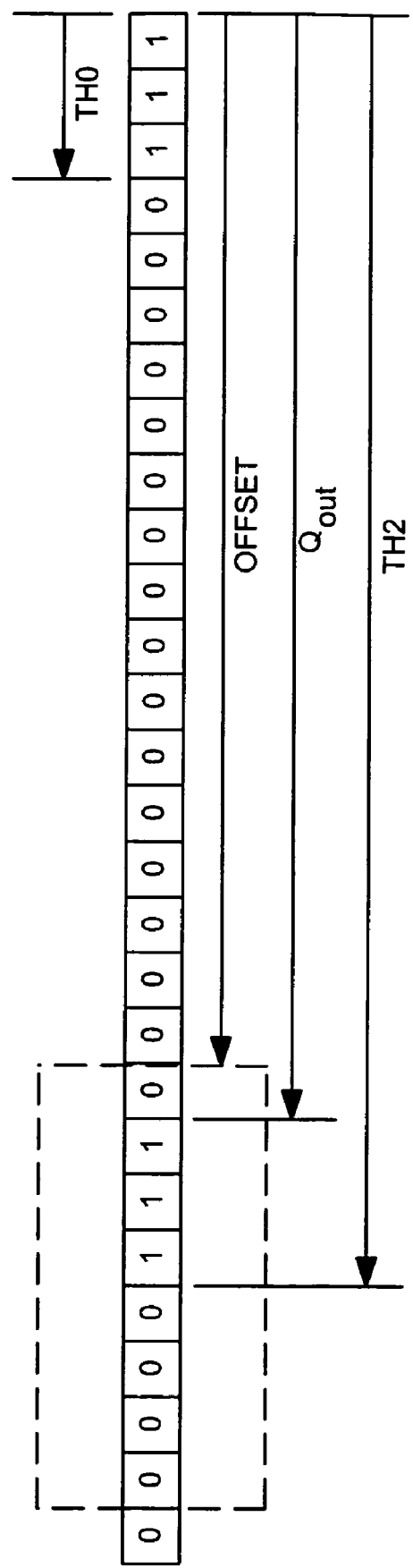
FIG. 21 illustrates the need for TH2.
Figure 22:
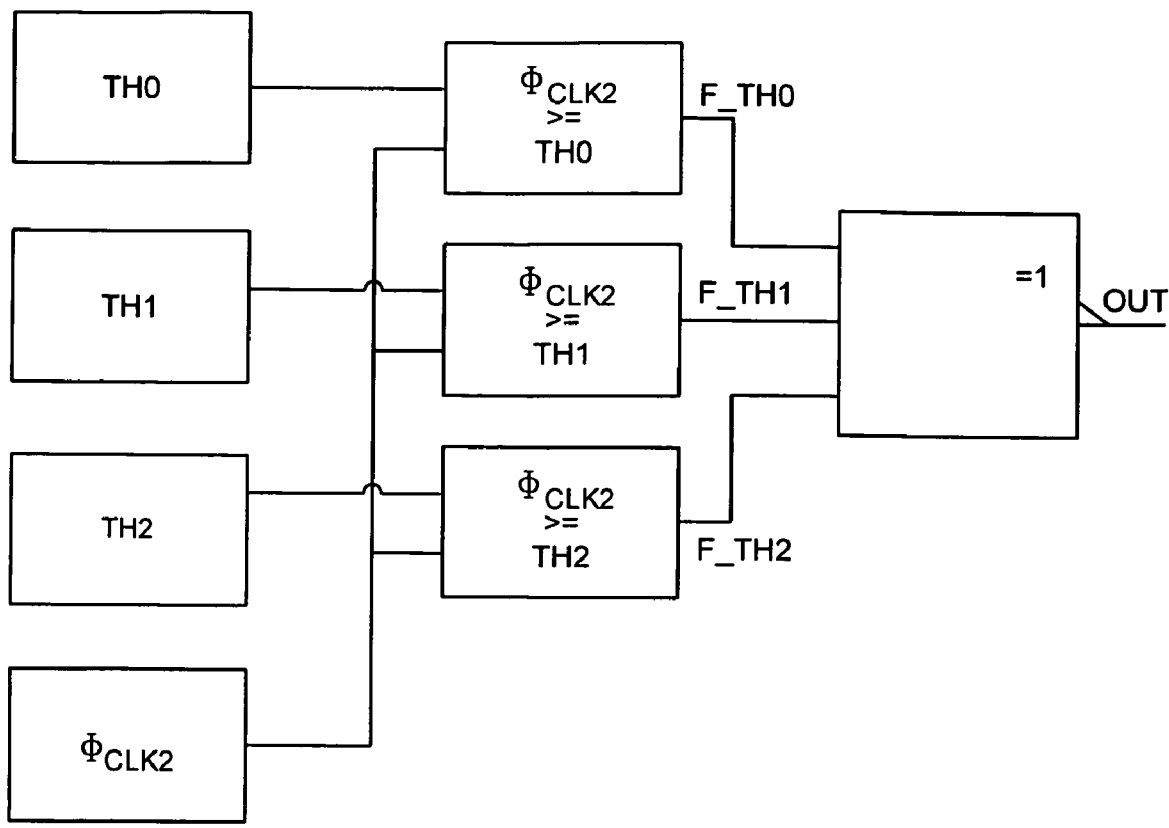
FIG. 22 is a functional block diagram of three thresholds and a combiner circuit.

When threshold TH0 is small, in fact smaller than $Q_{FB}$, it will come close to threshold TH1 of the previous cycle. Just as with TH1 at the end of the cycle, it needs to be detected in the previous cycle as shown in FIG. 21. Again we need an additional threshold comparator to compare the cycle counter with threshold TH2. The value for TH2 will be $TH0_{+Qout}$. However when TH0 is guaranteed to be always bigger than $Q_{FB}$ this TH2 threshold is not needed. As display in FIG. 22 the outputs of the comparators is put in an EXNOR again.

Again multiple values for the output of the thresholds are generated is same way as is used for the single threshold. And again output results of the thresholds are bitwise EXNOR'ed in a $Q_{FB}$ wide word.

Depending on the value $Q_{out}$ up to $Q_{FB}$ edges can be present in the output. The maximum number of edges occurs when $Q_{out}$ is 2 when every high speed clock an edge occurs. This would imply that we need a total of $Q_{FB}$ threshold circuits. This however is undesirable because of the big hardware overhead.

For output divider ratios bigger than the cycle counter capacity $MAX_{CNT}$ assistance is needed. An external process, for instance a program running on a microprocessor, does the cycle counting but at a much slower rate. When it is implemented in software only a change in the software is needed to expand the counting capability. The cycle counter SWcnt is compared with the thresholds SWTHx in software and it is checked whether the event occurs within the range MAXcnt of the hardware cycle counter. Then the counter is loaded with 0 and the appropriate values are loaded in the threshold registers. The algorithm below is an example how to calculate the thresholds.

```
cyclecnt = 0;
If ((SWTH0 − SWcnt) < 0)
        {// event has occurred
        TH0 = 0;
        }
else
        {
```

-continued

```
        if (( SWTH0- - SWcnt) < MAXcnt)
        {
            // within reach of the counter
            TH0 = SWTH0 - SWcnt;
        }
        else
        {
            // out of reach of the counter
            TH0 = MAXcnt;
        }
    }
    if (( SWTH1 - SWcnt) < MAXcnt)
    {
        // within reach of the counter
        TH1 = SWTH1 - SWcnt;
    }
    else
    {
        // out of reach of the counter
        TH1 = MAXcnt;
    }
    if (( SWTH2 - SWcnt) < MAXcnt)
    {
        // within reach of the counter
        TH2 = SWTH2 - SWcnt;
    }
    else
    {
        // out of reach of the counter
        TH2 = MAXcnt;
    }
```

This algorithm must be executed at regular intervals. When the interval is a fraction of the time interval that corresponds to the maximum counter value it will be robust for missing update ticks over the maximum capacity of the cycle counter. Everything goes well as long as the hardware counters are updated at least once for the maximum count interval.

When the counter crosses the maximum counter value $MAX_{CNT}$ minus ($Q_{FB}+1$) it must stop. The counter may not wrap around. This way the last output value is maintained until the software concludes the counter is in reach for the next edge.

Figure 23:
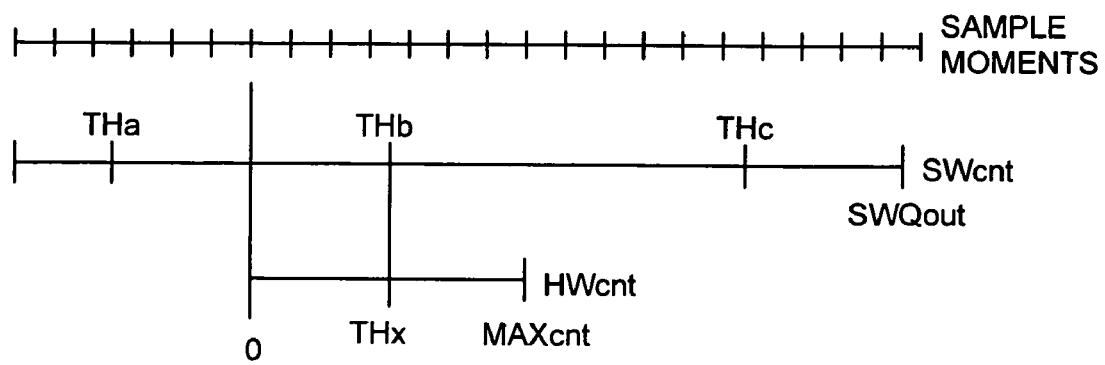
FIG. 23 illustrates an extended threshold method.

In FIG. 23 threshold THa has already been passed by the cycle counter. One of the hardware thresholds will programmed with 0 to indicate passing the threshold. Threshold THb falls within the range of the hardware cycle counter and one of the hardware thresholds is programmed with the difference between the current software countervalue and the software threshold THb. The third threshold THc is still outside the scope of the hardware cycle counter and the hardware threshold will be programmed with all 1's a value the hardware counter will never reach.

These embodiments offer the advantages that the shifters can run at a higher frequency than counters; no counters are required in the high frequency domain (This Reduces the factory testing time), alignment of DCO and the output counters Flexible in division ratios, flexibility in the wave pattern, and offset easy to realize in steps of one high-speed clock cycle. Thus embodiments of the invention use two clocks CLK1 and CLK2 with a frequency ratio QFB, with a low-speed counter running on clock CLK1, a high speed counter running on clock CLK2, and a series parallel converter. The low frequency clock CLK1 is used for counting, output decoding or waveform generation. The high frequency clock CLK2 is used to output the waveform. A sub rate of the high frequency clock can also be used to output the waveform.

Each cycle of the clock CLK1 the counter value will be normally increased by QFB. When a subrate S of CLK1 is used the counter will be with S*QFB. A modulo $Q_{out}$ operation is performed on the result of the counter where $Q_{out}$ is the output division ratio. Embodiments of the invention include concurrent calculation of multiple output values, a table containing the output waveforms for varying division ratios, wherein the counter value is used as an offset in the waveform for the chosen division ratio $Q_{out}$ to get the next $Q_{FB}$ output values.

Thresholds can be used to define the edges of the output signal, wherein the threshold is compared with the counter value, and the results of the threshold comparators are combined to form the output signal.

An external processor or computer can be used to update the counters and thresholds to be able to count beyond the physical limits of the hardware counters. In that case the counting is done by the computer or processor and the counter and thresholds are programmed to cover between the update moments. The limited counting range is extended by the software running on the computer or processor.

In the extended threshold mode the counters will not wrap around but halt when comes near the maximum count value.

A parallel-series converter is used to output the data with aid of high speed clock CLK2. The parallel-series converter can be implemented as a parallel load shifter or multiplexer, a combination of a multiplexer and parallel load shifter.

An external process can initialize and update the counter values and threshold values. This can be a processor or a computer. An optimal solution comprises a combination of the three described methods (table, edge and extended edge). The use more than three thresholds can create more complex waveforms than clock and frame pulses. Multiple sets of low-speed counter, decoder, high-speed counter and series-parallel converter can be used by a pair of low-speed CLK1 and high speed CLK2 clocks. When the division ratios are powers of 2 optimizations can be performed to reduce the amount of hardware.

The invention claimed is:

1. A frequency synthesizer comprising:
    a first clock running at a frequency $f_{CLK1}$;
    a second clock running at a frequency $f_{CLK2}$, wherein frequency $f_{CLK2}$ is higher than frequency $f_{CLK1}$, said frequencies having a fixed ratio $Q_{FB}=f_{CLK2}/f_{CLK1}$;
    a counter driven by said first clock and incrementing by a predetermined number which is either $Q_{FB}$ or a submultiple of $Q_{FB}$ for each cycle of said first clock;
    a decoder for converting the output of said counter to produce $Q_{FB}$ or a submultiple thereof output values in parallel in successive cycles of said first clock; and
    a parallel-serial converter for serially outputting said output values at a rate determined by said second clock.

2. A frequency synthesizer as claimed in claim 1, wherein said counter is incremented by $Q_{FB}$ for each cycle of said first clock, and said parallel-serial converter outputs $Q_{FB}$ output values at the rate of said second clock.

3. A frequency synthesizer as claimed in claim 1, wherein said parallel-serial converter outputs a submultiple of said $Q_{FB}$ output values at a sub-rate said second clock.

4. A frequency synthesizer as claimed in claim 1, wherein said second clock is provided by a phase locked loop deriving said second clock from said first clock.

5. A frequency synthesizer as claimed in claim 1, wherein said counter comprises a modulo counter, and an adder is provided to add a value $Q_{FB}$ mod $Q_{out}$ to said counter, where mod $Q_{out}$ is the modulo value of said counter, for each cycle of said first clock.

6. A frequency synthesizer as claimed in claim 1, wherein said decoder comprises a look-up table storing a complete set of output values, and the value of said counter is applied as an offset in said table to determine the next output values.

7. A frequency synthesizer as claimed in claim 1, wherein said table contains set of output values for different division ratios.

8. A frequency synthesizer as claimed in claim 1, wherein said decoder comprises a threshold detector to determine whether the output of the counter is above or below a predetermined threshold value.

9. A frequency synthesizer as claimed in claim 6, wherein said decoder subtracts said threshold value–$Q_{FB}$ from the current counter value, and determines the offset from said subtraction.

10. A frequency synthesizer as claimed in claim 9, wherein if the result of said subtraction is negative, said decoder uses zero as an offset, if the result of said subtraction falls between 0 and $Q_{FB}$, said decoder uses the difference as the offset, and if the result is above $Q_{FB}$, $Q_{FB}$ is used as the offset.

11. A frequency synthesizer as claimed in claim 10, further comprising a barrel shifter to produce said output values from said look-up table.

12. A frequency synthesizer as claimed in claim 9, wherein said parallel-serial converter is selected from the group consisting of: a parallel load shifter, a multiplexer, and a combination of a multiplexer and parallel load shifter.

13. A frequency synthesizer as claimed in claim 1, wherein said decoder comprises an external microprocessor counting cycles of said second clock and compares the counted cycles with a predetermined threshold.

14. A method of frequency synthesis comprising:
providing a first clock running at a frequency $f_{CLK1}$;
providing a second clock running at a frequency $f_{CLK2}$, wherein frequency $f_{CLK2}$ is higher than frequency $f_{CLK1}$, said frequencies having a fixed ratio $Q_{FB}=f_{CLK2}/f_{CLK1}$;
incrementing a counter by a predetermined number which is either $Q_{FB}$ or a submultiple of $Q_{FB}$ for each cycle of said first clock;
converting the output of said counter to produce $Q_{FB}$ or a submultiple thereof output values in parallel in successive cycles of said first clock; and
serially outputting said output values at a rate determined by said second clock.

15. A method as claimed in claim 14, wherein said counter is incremented by $Q_{FB}$ for each cycle of said first clock, and $Q_{FB}$ output values are output at the rate of said second clock.

16. A method as claimed in claim 14, wherein submultiples of said $Q_{FB}$ output values are output at a sub-rate of said second clock.

17. A method as claimed in claim 14, wherein a value $Q_{FB}$ mod $Q_{out}$ is added to said counter, where mod $Q_{out}$ is the modulo value of said counter, for each cycle of said first clock.

18. A method as claimed in claim 14, further comprising storing a complete set of output values in a look-up table, and applying the output of said counter an offset in look-up table to determine the next output values.

19. A method as claimed in claim 18, wherein said table contains set of output values for different division ratios.

20. A frequency synthesizer as claimed in claim 18, comprising subtracting said threshold value–$Q_{FB}$ from the current counter value, and determines the offset from said subtraction.

* * * * *